United States Patent [19]

Murata

[11] Patent Number: 5,515,114
[45] Date of Patent: May 7, 1996

[54] MOTION-VECTOR DETECTION APPARATUS FOR A VIDEO SIGNAL

[75] Inventor: Eri Murata, Tokyo, Japan

[73] Assignee: NEC Corporation, Tokyo, Japan

[21] Appl. No.: 314,407

[22] Filed: Sep. 27, 1994

[30] Foreign Application Priority Data

Sep. 28, 1993 [JP] Japan .................................. 5-240974

[51] Int. Cl.$^6$ .................................................. H04N 7/24
[52] U.S. Cl. ............................................ 348/699; 348/420
[58] Field of Search .................................... 348/384, 390,
348/402, 407, 412, 413, 415, 416, 420,
699; H04N 7/130, 7/137

[56] References Cited

U.S. PATENT DOCUMENTS

| 4,460,923 | 7/1984  | Hirano et al. | 348/413 |
| 4,683,494 | 7/1987  | Furukawa et al. | 348/416 |
| 5,046,071 | 9/1991  | Tanoi | 348/402 |
| 5,063,608 | 11/1991 | Siegel | 348/405 |
| 5,177,608 | 1/1993  | Ohki et al. . | |
| 5,258,836 | 11/1993 | Murata | 348/416 |

FOREIGN PATENT DOCUMENTS 58-107785   6/1983   Japan .

Primary Examiner—Tommy P. Chin
Assistant Examiner—Richard Lee
Attorney, Agent, or Firm—Young & Thompson

[57] ABSTRACT

A frame difference accumulator accumulates differences between the present frame and the previous frame of an input video signal in each block and outputs an accumulated value of each block. A motion detector detects a candidate motion vector and an evaluation function value of the candidate motion vector in each block. A region detector outputs a threshold selection control signal on the basis of the accumulated value. A threshold selector selects one of a low threshold and a high threshold as a selected threshold in each block. A comparing section compares a difference between the accumulated value and the evaluation function value with the selected threshold and outputs a vector selection control signal. A vector selector selects one of a zero vector and the candidate motion vector as a motion vector of each block.

4 Claims, 5 Drawing Sheets

MOTION-VECTOR DETECTION APPARATUS FOR A VIDEO SIGNAL

BACKGROUND OF THE INVENTION

This invention relates to a motion-vector detection apparatus for an input video signal, particularly to a motion-vector detection apparatus used in a motion compensated interframe coding apparatus for the input video signal.

In the motion compensated interframe coding, a frame of the input video signal is divided into a plurality of blocks each consisting of, for example, 8 scanning lines×8 picture elements. Then, a motion vector of each block is detected on the basis of evaluation function values, which indicate positional dissimilarity between the block of a present frame and a two-dimensionally shifted block of a previous frame. One of the shift vectors representing the minimum evaluation function value is detected as a candidate motion vector of each block of the present frame.

Referring to FIG. 1, a conventional motion-vector detection apparatus is hereinafter described.

As shown in FIG. 1 the conventional motion-vector detection apparatus comprises:

- a motion-vector detector (MV-DET) 3 for detecting and outputting the candidate motion vector of the present frame 36 ($V'_{opt\ x}$, $V'_{opt\ y}$) and the minimum evaluation function value 35 ($\Sigma|MCFD|$) corresponding to the candidate motion vector;

- a frame difference accumulator (FDA) 2 for accumulating absolute values of frame differences in each block between a present frame video signal 21 and a previous frame video signal 22 and outputting the accumulated value 25 ($\Sigma|FD|$), which corresponds to an evaluation function value of a zero shift vector;

- a comparison section 5 for comparing a difference between the minimum evaluation function value 35 ($\Sigma|MCFD|$) and the accumulated value 25 ($\Sigma|FD|$) with a predetermined threshold (T) and generating a vector selection control signal 56; and

- a selector 6 for selecting one of the candidate motion vector 36 and a zero vector in accordance with the vector selection control signal 56 and outputting the selected one as a motion vector 61 ($V'_{opt\ x}$, $V'_{opt\ y}$).

The comparison section 5 includes a subtracter 51 for subtracting the minimum evaluation function value 35 ($\Sigma|MCFD|$) from the accumulated value 25 ($\Sigma|FD|$); an absolute value calculating circuit 52 for calculating an absolute value of an output of the subtracter 51; and a comparator 53 for comparing the absolute value with the threshold (T) and supplying the vector selection control signal 56 to the selector 6.

The operation of the conventional motion-vector detection apparatus will now be explained.

The frame difference accumulator 2 accumulates in each block the absolute values of the frame difference signal between the present frame video signal and the previous frame video signal. Then, the frame difference accumulator 2 outputs the accumulated value 25 ($\Sigma|FD|$) to the comparison section 5.

The motion-vector detector 3 calculates evaluation function values in each block of the present frame for various shift vectors and detects the minimum value among them. Then, the detector 3 outputs a shift vector corresponding to the minimum value as the candidate motion vector 36, which is supplied to the selector 6. In addition, the detector 3 outputs the minimum value 35 ($\Sigma|MCFD|$) to the comparison section 5.

In the comparison section 5, the subtracter 51 subtracts the minimum evaluation function value 35 ($\Sigma|MCFD|$) from the accumulated value 25 ($\Sigma|FD|$) and outputs the subtracted value of each block to the absolute value calculating circuit 52. The absolute value calculating circuit 52 outputs an absolute value D of the subtracted value, or D=$|\Sigma|FD|-\Sigma|MCFD||$ to the comparator 53.

The comparator 53 compares the value (D) with the predetermined threshold (T). If the value (D) is larger than the threshold (T), the comparator 53 outputs a first level of the vector selection control signal 56, which causes the selector 6 to select the candidate motion vector 36 as the motion vector 61 of each block. Otherwise, the comparator 53 outputs a second level of the selection control signal 56, which causes the selector 6 to select the zero vector as the motion vector 61 of each block.

In other words, the comparison section 5 causes replacement of the candidate motion vector 36 of each block with the zero vector when the difference between the minimum evaluation function value ($\Sigma|MCFD|$) and the accumulated value ($\Sigma|FD|$) is small. This prior art is disclosed in Japanese Laid-Open Patent Publ. No. 58-107785 (1983).

The replacement of the candidate motion vector provides better reproduced picture quality in a stationary uniform background part of a reproduced video signal. If the motion compensated interframe coding without the replacement is applied to the stationary uniform background part, there is a case where non-zero vectors are detected as the motion vectors in the background part due to noises included in the input video signal. In this case, noises due to the coding (referred to hereinafter as "coding noises") are observed to move in accordance with misdetected motion vectors due to the noises in the input video signal. The coding noises which move in the stationary uniform background provide observers with degraded picture quality. Since the difference between the minimum evaluation function value ($\Sigma|MCFD|$) and the accumulated value ($\Sigma|FD|$) is often small in the stationary uniform background part, the modification improves the picture quality of the reproduced video signal.

However, the effect of improving the picture quality by this replacement is insufficient because an optimum value of the threshold (T) is very sensitive.

For example, FIG. 2A shows an example of motion-vector detection results by the conventional apparatus. In FIG. 2A, arrows show the detected motion vectors. One can see that the non-zero candidate motion vectors are insufficiently converted to zero vectors.

It is possible to eliminate the misdetected candidate motion vectors completely by making the threshold (T) high. However, in doing so, the coding efficiency of the motion compensated interframe coding degrades because many candidate motion vectors in the motion part of the video signal are also converted to zero vectors as shown in FIG. 2B. On the other hand, if the threshold is made low, the number of the misdetected vectors in the stationary uniform background increases as shown in FIG. 2C.

SUMMARY OF THE INVENTION

It is therefore a principal object of the invention to provide a motion-vector detection apparatus for an input video signal, which prevents misdetection of motion vectors in a stationary part of an input video signal and miscorrection of candidate motion vectors in a motion part of the video signal, and which improves coding efficiency and reproduced picture quality of a motion compensated interframe coding apparatus with a motion-vector detection apparatus.

According to the invention, there is provided a motion-vector detection apparatus for detecting motion vectors of an input video signal, comprising:

a frame difference accumulator for accumulating the absolute values of frame differences in each block between the present frame and the previous frame of the input video signal and outputting the accumulated value in each block;

a motion-vector detector for detecting a candidate motion vector of each block and for outputting the candidate motion vector and an evaluation function value of the candidate motion vector;

a region detector for classifying blocks of the present frame into stationary parts and motion parts and for outputting a threshold selection control signal;

a first selector for selecting one of at least a first threshold and a second threshold in accordance with the threshold selection control signal and outputting the selected threshold;

a comparison section for comparing the difference between the accumulated value and the evaluation function value with the selected threshold and for outputting a vector selection control signal;

a second selector for selecting one of a zero vector and the candidate motion vector in accordance with the vector selection control signal and outputting the selected one in each block as the motion vectors of the input video signal.

DETAILED DESCRIPTION OF PREFERRED EMBODIMENTS

Figure 3:
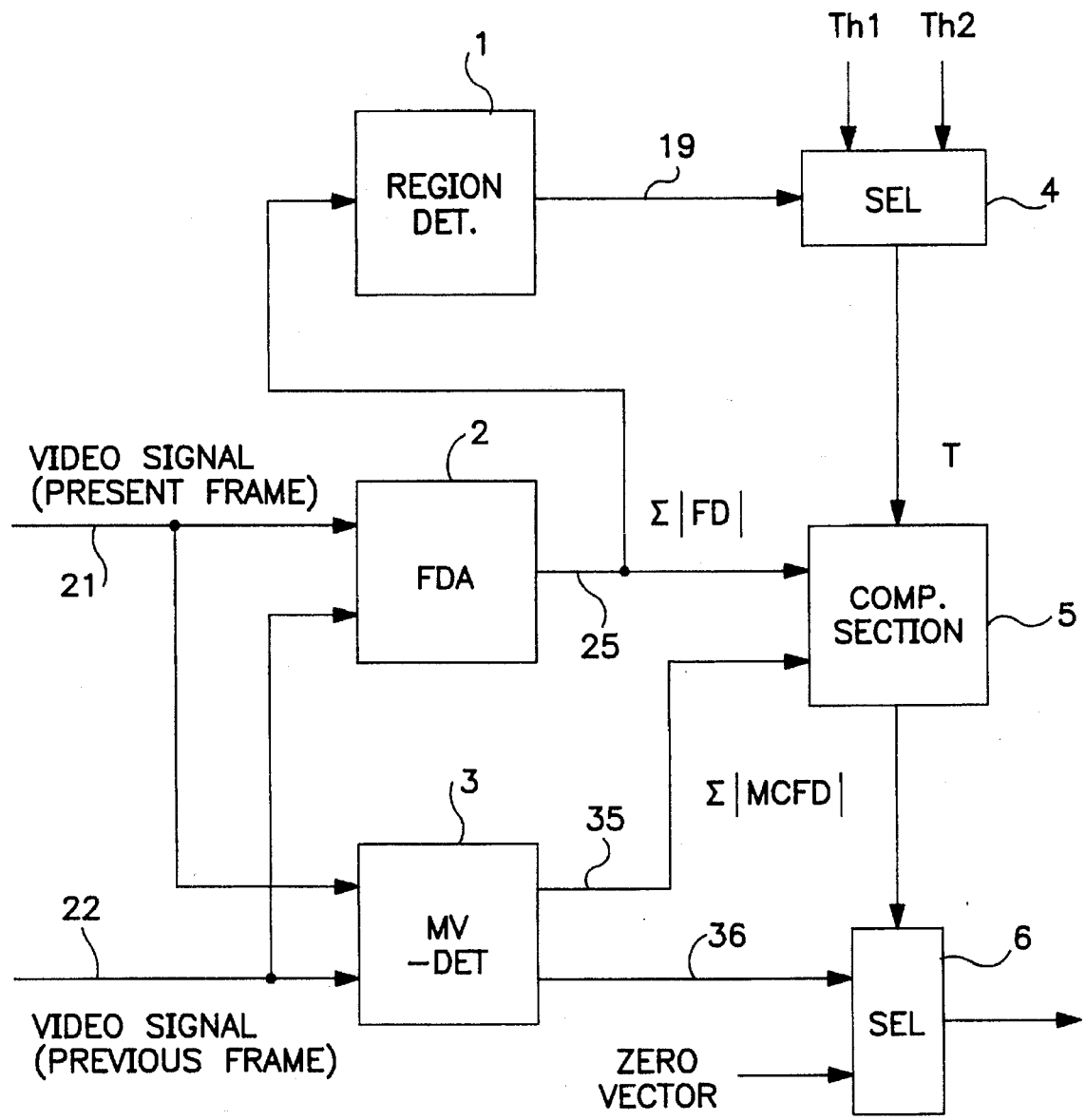
FIG. 3 shows a block diagram of a preferred embodiment of the invention.

Referring to FIG. 3, a preferred embodiment of the invention will now be described.

Figure 1:
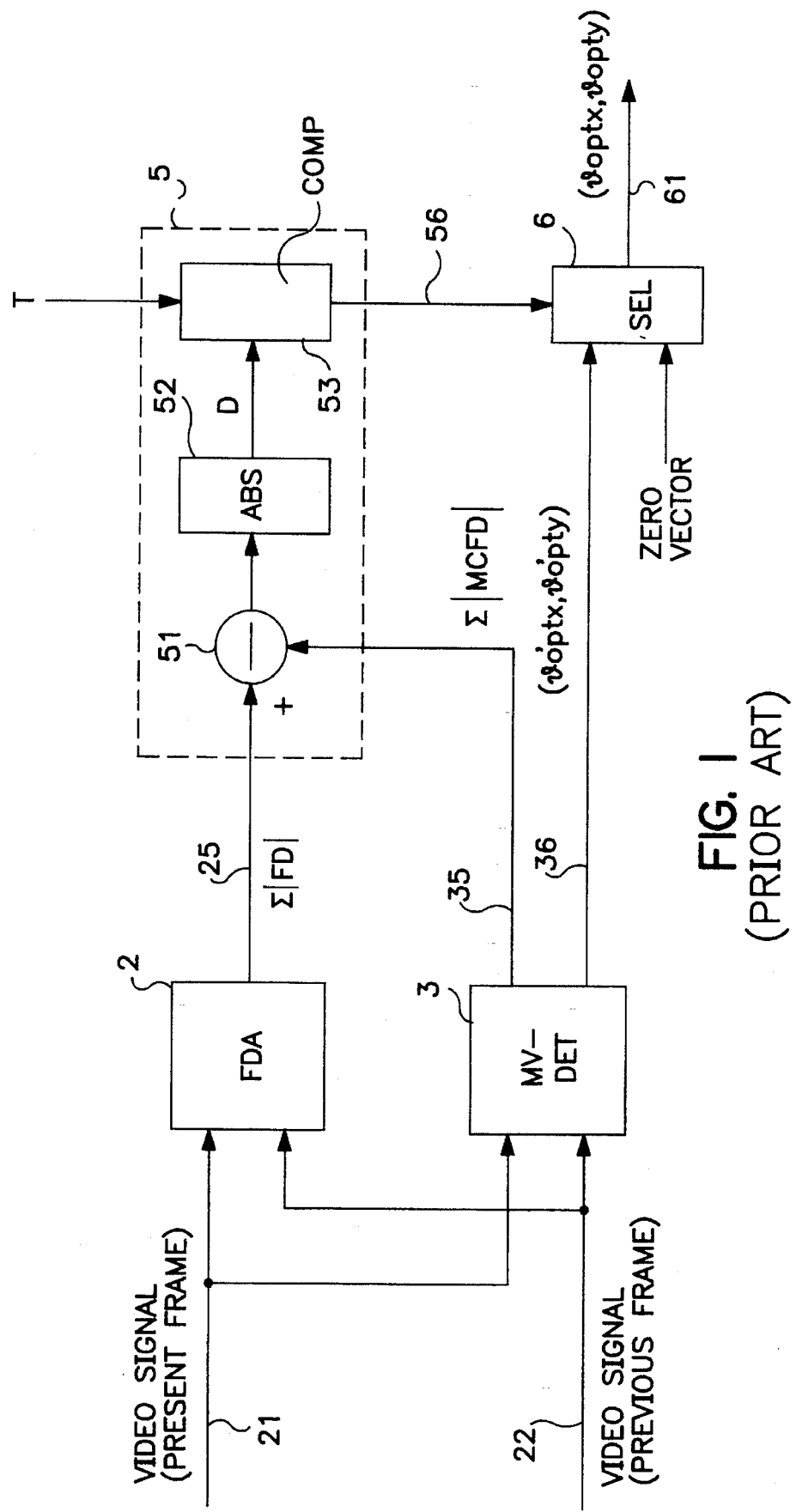
FIG. 1 shows a block diagram of a conventional motion-vector detection apparatus.
Figure 2A:
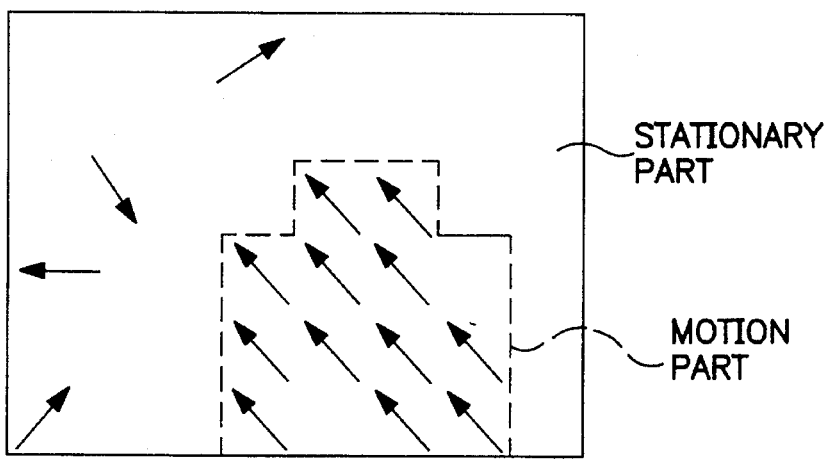
FIG. 2A shows an example of motion-vector detection result by the conventional apparatus.
Figure 2B:
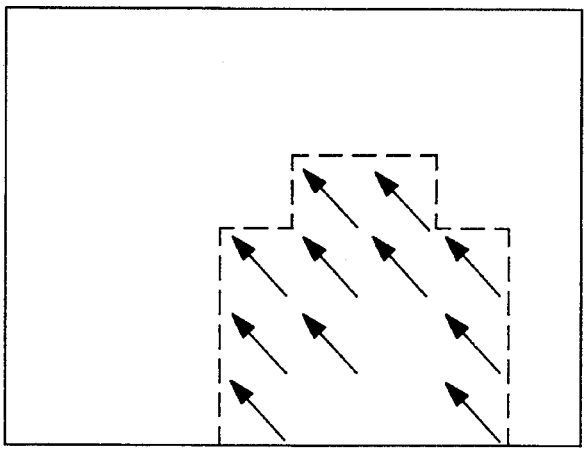
FIG. 2B shows an example of motion-vector detection result by the conventional apparatus when a value of a threshold is higher than that of FIG. 2A.
Figure 2C:
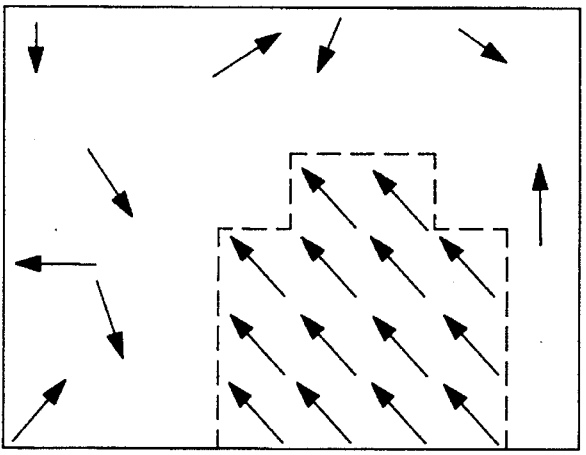
FIG. 2C shows an example of motion-vector detection results by the conventional apparatus when the value of the threshold is lower than that of FIG. 2A.

As shown in FIG. 3, in addition to the conventional motion-vector detection apparatus of FIG. 1, this embodiment includes:

a region detector 1 for classifying blocks of the present frame into a stationary part and a motion part responsive to the accumulated value 25 ($\Sigma$|FD|) and outputting a threshold selection control signal 19; and a first selector 4 for selecting at least one of a low threshold (Th1) and a high threshold (Th2) and outputting the selected threshold (T) to the comparison section 5.

Since operations of the frame difference accumulator 2, the motion vector detector 3, comparison section 5 and second selector 6 are the same as in FIG. 1, explanations of these elements need not be repeated.

The region detector 1 classifies each block of the video signal of the present frame into a motion part and a stationary part. Then, the region detector 1 outputs to the first selector 4 the threshold selection control signal 19 indicating whether the present block belongs to the motion part or the stationary part. Embodiments of the region detector 1 may be as disclosed in OHKI et al. U.S. Pat. No. 5,177,608, the entirety of which patent is therefore hereby expressly incorporated by reference. An example of the region detector disclosed in that patent will be described later.

The threshold selector 4 selects one of the low threshold (Th1) and the high threshold (Th2) in accordance with the threshold selection control signal 19. More specifically, the selector 4 selects the low threshold (Th1) and outputs it to the comparison section 5 as the threshold (T) if the threshold selection control signal 19 indicates that the present block belongs to the motion part. Otherwise, the selector outputs the high threshold (Th2) as the threshold (T).

Figure 4:
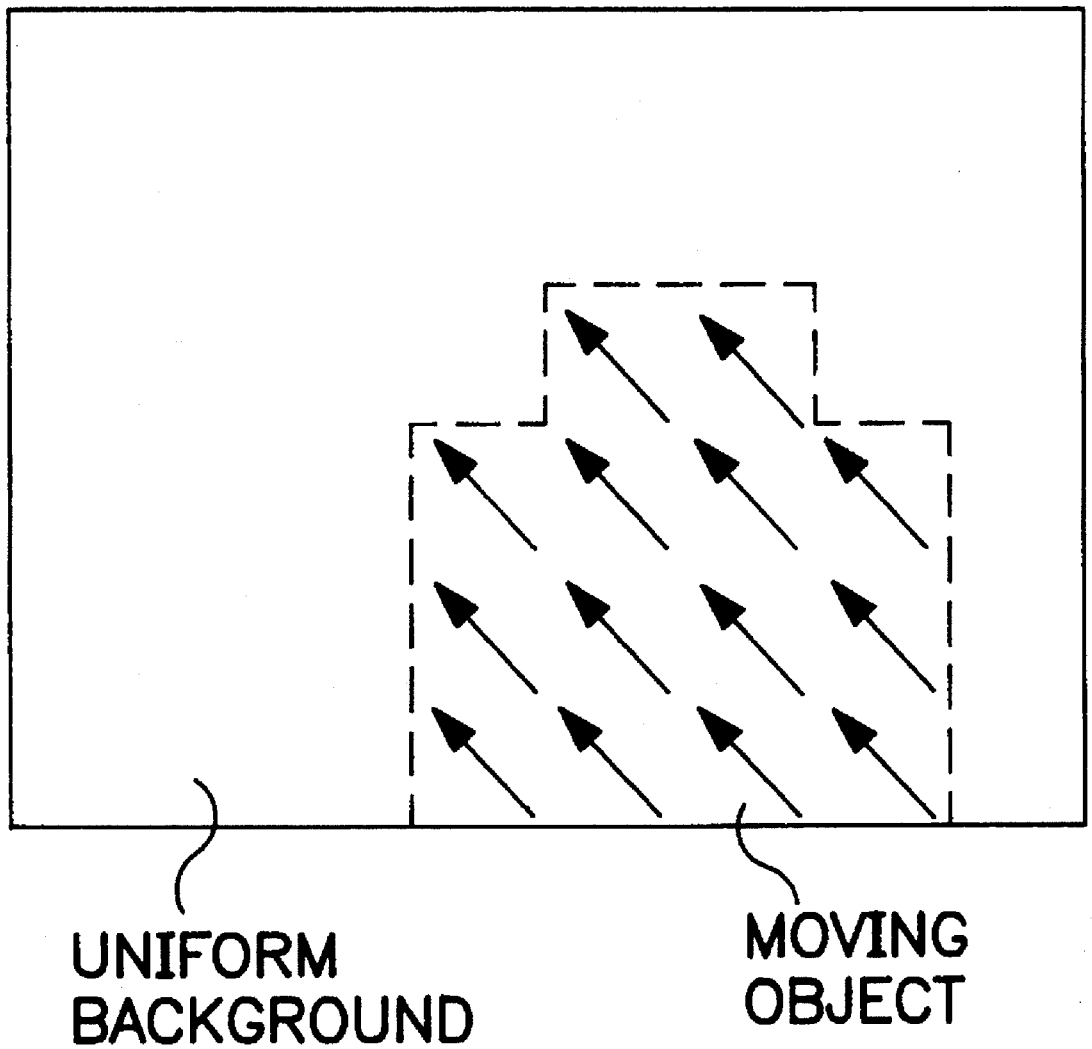
FIG. 4 shows an example of motion-vector detection result by the invention.

By the above-mentioned operation of the region detector 1 and the selector 4, the invention makes the threshold (T) high for blocks of the stationary part and eliminates the misdetected candidate vectors completely in the stationary part. Moreover, the invention makes the threshold (T) low for blocks of the motion part and prevents the candidate motion vectors from being inadvertently replaced by zero vectors. FIG. 4 demonstrates the effect of the invention.

Figure 5:
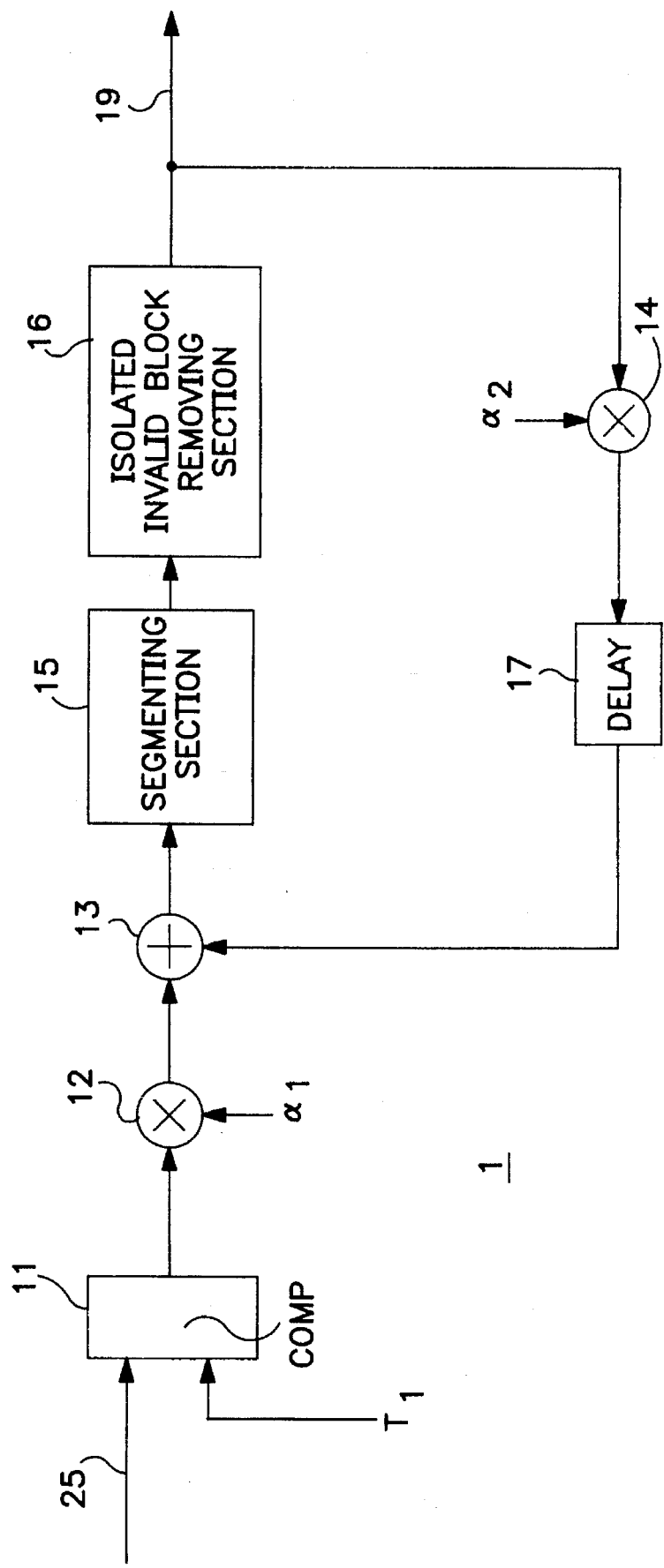
FIG. 5 shows a block diagram of an example of the region detector 1 of FIG. 3.

Referring to FIG. 5, an example of the region detector 1 is hereinafter described.

As shown in FIG. 5, the region detector 1 comprises:

a first comparator 11 for comparing the accumulated value 25 of each block with a first threshold and outputting a first valid block map of the present frame;

a first multiplier 12 for multiplying values of the first valid block map by a constant $\alpha_1$ and outputting a weighted first valid block map;

an adder 13 for adding the weighted first valid block map to a weighted and delayed fourth valid block map and outputting a second valid block map;

a segmenting section 15 for obtaining a third valid block map by performing predetermined segmentation of the second valid block map;

an isolated invalid block removing section 16 for obtaining a fourth valid block map by replacing isolated invalid blocks in the third valid block map with valid blocks and for outputting values of the fourth invalid block as the threshold selection control signal;

a second multiplier 14 for multiplying the values of the fourth valid block map by a constant $\alpha_2$ and outputting a weighted fourth valid block map; and a delay circuit 17 for delaying the weighted fourth valid block map by one frame time of the video signal and outputting the weighted and delayed fourth valid block map.

The comparator 11 compares the accumulated value 25 of each block ($\Sigma$|FD|) with a first threshold (T). If the value 25 is greater than or equal to the first threshold, the block is given a positive constant value. Otherwise, the block is given a zero value. In this manner, the comparator 11 obtains the first valid block map, which is supplied to the first multiplier 12.

The multiplier 12 multiplies the first valid block map by a positive constant $\alpha_1$ and outputs a weighted first valid block map to the adder 13. The adder 4 adds the weighted first block map to the weighted and delayed fourth valid block map supplied from the delay circuit 17 and outputs the second valid block map, which is supplied to a segmenting section 15.

The segmenting section 15 adds a value of the present block to a sum of values of the neighboring blocks in the second valid block map. Next, the segmenting section 15 obtains the third valid block map by comparing the added result of each block with a second threshold. The third valid block map is supplied to the isolated invalid block removing section 16.

The isolated invalid block removing section 16 removes isolated invalid blocks each surrounded by valid blocks.

More specifically, the isolated invalid block removing section changes the isolated invalid blocks to valid blocks and links valid blocks separated by the invalid blocks with each other.

The multiplier 14 multiplies the values of the fourth valid block map by a positive constant $\alpha_2$ and outputs a weighted fourth valid block map to the delay circuit 17. The delay circuit 17 delays by one frame time the weighted fourth valid block map and outputs the weighted and delayed fourth valid block map to the adder 13.

While the region detector 1 was described by using only one example, other embodiments of a region detector which are, for example, disclosed in U.S. Pat. No. 5,177,608 may be also used as the region detector 1.

As described above, the invention provides a motion-vector detection apparatus for an input video signal, which prevents misdetection of motion vectors in a stationary part of the video signal and miscorrection of motion vectors in a motion part of the video signals and which improves coding efficiency and reproduced picture quality of a motion compensated interframe coding apparatus with a motion-vector detection apparatus.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

I claim:

1. A motion-vector detection apparatus for detecting motion vectors of an input video signal, comprising:

a frame difference accumulator for accumulating the absolute values of frame differences in each block between the present frame and the previous frame of said input video signal and outputting the accumulated value of said each block;

a motion-vector detector for detecting a candidate motion vector of said each block and for outputting the candidate motion vector and an evaluation function value of said candidate motion vector;

a region detector for classifying blocks of each present frame into a stationary part and motion part based on said accumulated value of each said block and outputting a threshold selection control signal;

a first selector for selecting one of a first threshold and a second threshold in accordance with said threshold selection control signal and outputting the selected threshold;

a comparison section for comparing a difference between said accumulated value and said evaluation function value with said selected threshold and for outputting a vector selection control signal;

a second selector for selecting one of a zero vector and said candidate motion vector in accordance with said vector selection control signal and outputting the selected vector.

2. The motion-vector detection apparatus as claimed in claim 1, wherein said second threshold is higher than said first threshold, said first selector selects said first threshold as said selected threshold if said block is classified to said motion part by said region detector and selects said second threshold if said block is classified to said stationary part.

3. The motion-vector detection apparatus as claimed in claim 2, wherein said comparison section comprises:

a subtracter for subtracting said evaluation function value from said accumulated value to output a subtracted signal;

an absolute value calculating circuit for calculating an absolute value of said subtracted signal; and a first comparator for comparing said absolute value with said selected threshold and outputting said vector selection control signal.

4. The motion-vector detection apparatus as claimed in claim 3, wherein said region detector comprises:

a second comparator for comparing said accumulated value of said each block with a third threshold and outputting a first valid block map of said present frame;

a first multiplier for multiplying said first valid block map by a first constant and outputting a weighted first valid block map;

an adder for adding the weighted first valid block map to a fourth valid block map of a previous frame and outputting a second valid block map;

a segmenting section for obtaining a third valid block map by summing values of the present block and the neighboring blocks in said second valid block map and by comparing the summed values with a fourth threshold;

an isolated invalid block removing section for obtaining a fourth valid block map by replacing isolated invalid blocks in said third valid block map with valid blocks and for outputting the fourth valid block map as said threshold selection control signal;

a second multiplier for multiplying the fourth valid block map by a second constant and outputting a weighted fourth valid block map; and a delay circuit for delaying said weighted fourth valid block map by one frame time of video signals and outputting said fourth valid block map of said previous frame.

* * * * *